(12) United States Patent
Westlake

(10) Patent No.: US 8,775,608 B2
(45) Date of Patent: Jul. 8, 2014

(54) ACCESSING INFORMATION FROM AN INTERNET USER'S WEB SESSION

(75) Inventor: Colin Westlake, London (GB)

(73) Assignee: Cardeasy Limited, London (GB)

( * ) Notice: Subject to any disclaimer, the term of this patent is extended or adjusted under 35 U.S.C. 154(b) by 275 days.

(21) Appl. No.: 12/967,621

(22) Filed: Dec. 14, 2010

(65) Prior Publication Data
US 2011/0145401 A1 Jun. 16, 2011

(30) Foreign Application Priority Data
Dec. 14, 2009 (GB) .................................. 0921829.8

(51) Int. Cl.
*G06F 15/173* (2006.01)

(52) U.S. Cl.
USPC .......................................................... 709/224

(58) Field of Classification Search
USPC ........................................ 709/204, 224, 227
See application file for complete search history.

(56) References Cited

U.S. PATENT DOCUMENTS

2002/0065912 A1 * 5/2002 Catchpole et al. ............ 709/224

* cited by examiner

*Primary Examiner* — Larry Donaghue
*Assistant Examiner* — Marshall McLeod
(74) *Attorney, Agent, or Firm* — Baker & Hostetler LLP

(57) ABSTRACT

A pre-existing reference number on a legacy website provided by a legacy website provider may be supplemented with an enhanced reference number capable of identifying an internet user engaged in a web session on the legacy website. A check may be made to establish whether the internet user's computing device has a state object, including a web user ID (wUID) unique to the internet user's computing device. A processor may create an enhanced reference number based on the pre-existing reference number upon receipt of a request, and an association between the wUID and the enhanced reference number may be stored in a database accessible by the website provider. The enhanced reference number may be made available to the user by displaying it in place of the pre-existing reference number on the legacy website via the web session.

30 Claims, 3 Drawing Sheets

ACCESSING INFORMATION FROM AN INTERNET USER'S WEB SESSION

CROSS REFERENCE TO RELATED APPLICATIONS

This application claims priority to Great Britain Patent Application No. GB0921829.8, filed Dec. 14, 2009, which is hereby incorporated by reference in its entirety.

BACKGROUND

In the fields of internet shopping, website error management and the provision of customer services, the customer may be an internet user, for example. For example, in these fields, a vendor may provide a website which is navigated by a user and which allows the user to contact the vendor by telephone, for example.

Transactions prompted by the use of an internet shopping website may be completed offline rather than through the website. In this way, the internet shopping website may be used as an initial source of information for a shopper who prefers to complete a purchase by another means, typically by discussing a purchase with an agent.

There are various reasons for this practice. Firstly, shoppers may want additional information about a product advertised on an internet shopping website which is not available on the website. This is particularly the case for expensive or niche items, about which a shopper may require further information before making a purchase to enable an informed choice, for example.

Internet shoppers who find themselves in such a predicament may make contact with the vendor and explain the circumstances to an agent. Whilst ultimately achieving the desired end result, this interaction with an agent typically involves discussing information already given or received via the internet shopping website and, to that extent, is tedious and time consuming for the shopper.

In addition to the disincentives for the shopper, this practice involves a great deal of extra work for the vendor, which must operate a well-staffed call centre at great expense to process the shoppers' enquiries. Any reduction in the time taken to process such enquiries will result in improved efficiency and reduced cost for the vendor, as well as a better service for the shopper.

Internet shoppers may have unique identities recognizable to the internet shopping website for assisting a shopper to purchase items. Such identities may be used to store contact information and bank details of the shopper, for example, and are typically accessible with a username and password known only to the shopper.

Once an internet shopper has created an identity, it is often possible for an agent to gain access to the identity to find out the stored information without needing to consult the shopper. However, the vendor must still be given enough information by the shopper to locate the identity within a database. A shopper may be reluctant to divulge personal information (particularly their internet usernames) to an agent over the telephone, particularly if the shopper is merely enquiring of a particular product. Accordingly, it is very difficult to associate a shopper with his or her identity during a subsequent interaction.

Sophisticated internet shopping sites may track the shopping trends of a shopper, based on the items they look at and purchase using the internet shopping website. Such schemes enable internet shopping sites to make recommendations to a shopper or even to tailor adverts used on the sites to the particular shopper, based on their preferences.

Such tracking techniques may be used to tailor the display of the internet shopping website to the particular shopper, to increase the likelihood of successfully attracting the shopper to consider an alternative product. These techniques may not help the shopper to find further information about a particular product. Nor do they allow agents to tailor their service to the shopper in a subsequent interaction unless the shopper has created an identity on the website and is prepared to divulge that identity to the agent.

Legacy website providers may use reference numbers for referring to specific products or services. Such website providers may not wish to redevelop their websites to provide enhanced services such as user tracking since it would be particularly laborious to do so.

SUMMARY

The devices, systems, and methods disclosed herein may provided enhanced services for website providers without having to incur the cost and work in redeveloping existing websites. A pre-existing reference number on a legacy website provided by a legacy website provider may be supplemented with an enhanced reference number capable of identifying an internet user engaged in a web session on the legacy website. The use of the enhanced reference number may facilitate interaction between the internet user and the website provider.

A check to establish whether the internet user's computing device has a state object for the website provider stored thereon may be made. The state object may include a web user ID (wUID) which is unique to the internet user's computing device and may identify the internet user. A request to provide an enhanced reference number for identifying the internet user's web session may be received. The request may contain the pre-existing reference number; A processor may create an enhanced reference number based on the pre-existing reference number upon receipt of the request. An association between the wUID and the enhanced reference number may be stored in a database accessible by the website provider. The enhanced reference number may be made available to the user by displaying it in place of the pre-existing reference number on the legacy website via the web session.

Also, the enhanced reference number may be received from the internet user during an interaction instigated by the internet user and a processor may access a database which has stored a relationship between the enhanced reference number and a web user ID (wUID) of the internet user. The wUID may be unique to the internet user's computing device and may identify the internet user.

DETAILED DESCRIPTION

Figure 1:
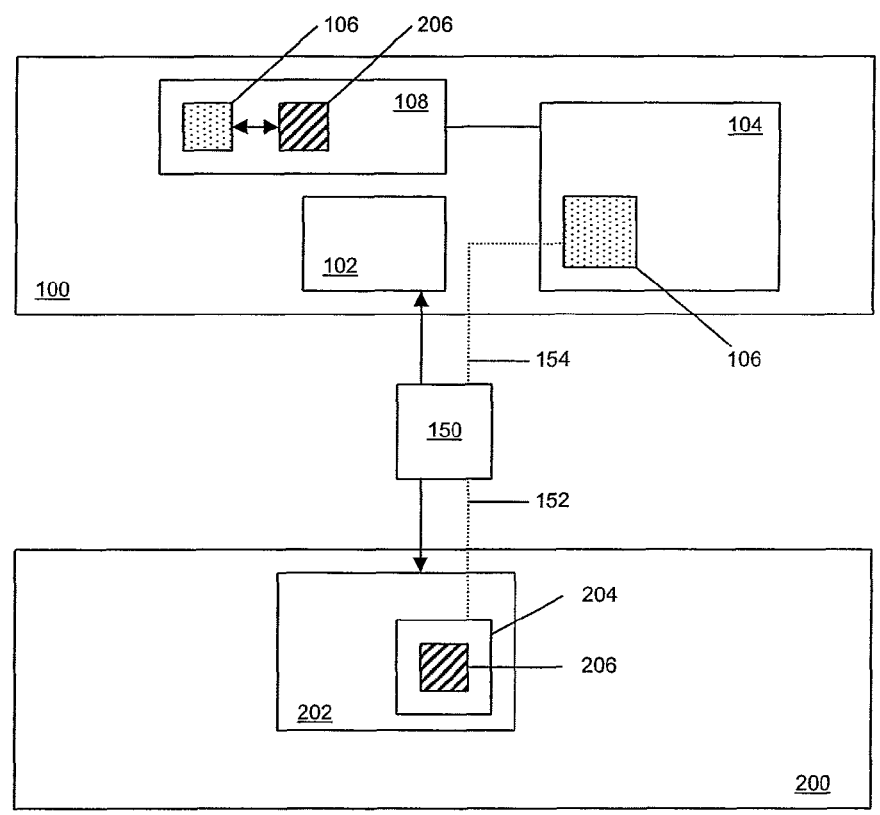
FIG. 1 is a schematic of a system with which the method of the present invention may be used.

Reference is firstly made to FIG. 1. An agent of a website provider 100 (such as a vendor or other internet service provider, for example) may be given access to information from a web session 150 and/or web session history of an internet user 200 (such as a shopper or other customer, for example) to enable the agent to better assist the internet user during a contemporaneous or subsequent interaction between the internet user and the agent.

In the present application, "web session" may refer to a period of substantially continuous interaction between the internet user's computing device 202 and the website provider's website 102. The web session may involve an exchange of information between the computing device 202 and the website 102.

Whilst the internet user is browsing the website provider's website 102, the internet user's web session 150 may be associated with a reference 106 which serves to identify the web session 150. The reference 106 may be a simple reference number shown to the internet user on the website provider's website. The reference 106 may take other forms as described in more detail below.

The reference 106 may be associated with the web session 150 any of the following manners. If the internet user is visiting the website 102 for the first time, a state object 204 (cookie) may be created and stored on the internet user's computing device 202. The state object 204 may comprise a web user ID (wUID) 206 which may be unique to the internet user's machine 202. The state object 204 and wUID 206 may be available during the web session 150 (as indicated by broken lines 152) to identify the browser in use by the internet user during the web session 150. If the internet user has visited the website 102 before, the state object 204 may already have been stored on the internet user's computing device 202 and a new state object may not be created. The stored state object 204 may comprise the wUID 206 of the internet user which may be unique to the internet user's computing device 202 and which may be available during the web session 150 (as indicated by broken lines 152), as before.

During the internet user's visit to the website provider's website 102, a web server belonging to the website provider or a third party may create a reference 106 for identifying the internet user's web session 150 and may link the reference 106 (as shown by broken lines 154) with the web session 150 and thereby with the wUID 206 of the newly created or existing state object 204, which may be available during the web session 150. The link between the reference 106 and the wUID 206 stored in the state object 204 may be stored on the web server or in a database 108.

The reference may be linked to the wUID. For example, the reference may be linked to the wUID by 'on site' (log file analysis), 'off site' (page tagging), and/or the like. For example, in page tagging, the wUID may be allocated to the internet user's web browser once the user first navigates to the website. Following communication of a first page request, the browser may accept a permanent cookie (within which is stored the web user ID) from the web server. Thereafter, with each subsequent page request during the present and any subsequent web session, the wUID may be sent to the web server.

If the internet user's browser is configured not to accept permanent cookies from the site, then details of a current session may be stored with the wUID. A user's current session may be associated with other sessions if the user provides a link to the wUID, such as by logging in to a registered account with which the wUID is already associated, for example.

If the internet user's browser has been configured not to accept any cookies at all, the session state may be maintained by means of embedding the session ID into the page URL and into the URL of any links referenced by the page. Many web servers are capable of doing this automatically.

Once the wUID has been associated with a user's browser (or equivalent), a link may be made between a reference and that wUID. An example implementation of a scheme wherein references are provided in as a portion of a product code follows.

With a cookie, and hence a wUID, stored on his machine, the internet user's browser may request a page from the web server and send the stored cookie with the request. The cookie may include the following field, for example:

webUserID=1234567890

The web server may consult a pool of unallocated references (by performing a lookup in the web server's database, for example) and select a particular reference to apply as a prefix to the product codes displayed on the page requested by the internet user. The web server may then remove the reference from the pool of unallocated references (by indicating in the database that the reference is in use, for example) and serve the page to the internet user.

For storing the links between a reference and a wUID to which it has been allocated, the following table schema may be used, for example:

webUserRefs
webUserID integer not null
referenceID char(4) not null
allocationDT dateTime null Use of a four letter reference gives approximately 0.45M unique references. References may be shorter or longer, depending on the particular requirements. Furthermore, the webUserID may well be alphanumeric in practice but is shown here as an integer for simplicity.

If no cookie is present in the page request made by the browser, the web server may allocate a new wUID from the database and may attempt to set a cookie, within which the wUID is stored. A cookie may either be set for the duration of the session and/or permanently, such that future visits may be associated with the current one.

Once established, the link between the reference and the web user ID may be retained in a searchable storage means such as a relational database. Depending on the type of reference scheme used, the relationship may either be "one to one", where a single wUID is associated with a single reference (such as a single reference number, for example) or "one to many", where a single wUID is associated with a batch of product codes, for example.

Figure 2:
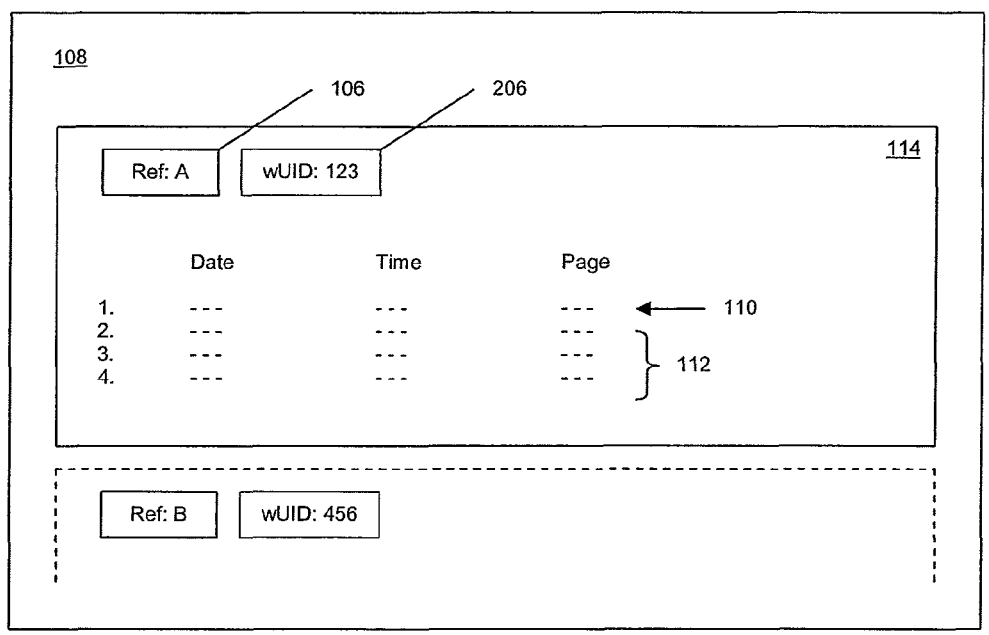
FIG. 2 is an example of a database on which details of an internet user's web session may be stored along with the reference and wUID in the system of claim 1.

As illustrated in FIG. 2, whilst the internet user browses the website provider's website 102, details 110 of the internet user's web session 150 may also be stored in the database belonging to the website provider or a third party as a record 114, using the internet user's stored wUID 206 as a key. This may be done using tracking techniques. Likewise, details 112 of the internet user's subsequent web sessions may also be stored in the database using the same wUID as a key, so long as the wUID remains stored on the user's machine.

Details 110, 112 of the internet user's web session 150 might include, for example, a list of pages the internet user has visited during the web session 150, the time and/or duration of each visit, the number of times the shopper visited each page, any errors received when accessing a page, and/or any other information concerning the internet user's web session which might be useful to an agent during an interaction with the internet user.

Alternatively, details might include information derived from more sophisticated analytical techniques, such as tracking an internet user's mouse movements; the links, text or images on which the user clicks; the addresses from which the internet user navigates to the current page, for example.

Using tracking techniques, information about the internet user's web session may be stored along with the wUID in the web server's database. For storing the information in connection with the wUID, the following table schema may be used, for example:

pageRequests
webUserID integer not null
DT dateTime
PageID varchar(20)
ReferrerURL varchar(100)

This schema would allow storage of the dates and times at which a given web user visited a given page along with basic data as to how the user arrived at the page in question. The schema, shown here, illustrates the operating principle. There may be many more fields to store various different types of information.

During the internet user's web session 150, the internet user may be motivated to contact the website provider. For example, a shopper might wish to contact a vendor to make further enquiries about a product; an internet user faced with an error message whilst browsing may wish to contact the website provider to resolve the error; and so on.

In such scenarios, the reference 106 may be made available to the internet user, who contacts the website provider and gives the reference 106 to the website provider's agent. In an embodiment, the internet user may simply telephone the website provider and quote the reference 106 to the agent. However, other forms of interaction between the internet user and the agent are possible, as will be discussed in more detail below.

Once the website provider's agent is in possession of the reference 106, the agent may use the reference 106 to gain access to the details 110, 112 of the internet user's web sessions which are linked to the reference 106 through the wUID 206, and may be stored with the wUID 206 in the database 108. The agent is now able to better assist the internet user by reference to the internet user's web session details 110, 112 during the interaction.

The following example continues that which began above, wherein a product code is used to convey a reference. However, the use of product codes is optional, and the reference may be provided in any form, as described below. When the internet user contacts the website provider's agent and communicates the reference by giving the agent a product code, the agent may enter the product code into a system, which may extract the referenceID from the product code, look up the wUID currently associated with that referenceID and select the web session information from the pageRequests table to present to the agent. The web session information may include previous sessions.

As well as the information about the user's web session previously discussed, the agent may be provided with access to the same view of the website as the internet user and/or navigational control to direct the internet user to new pages. Furthermore, the agent may construct and publish a custom page, based on the internet user's web session details, and direct the internet user to the custom page during their interaction.

Figure 3:
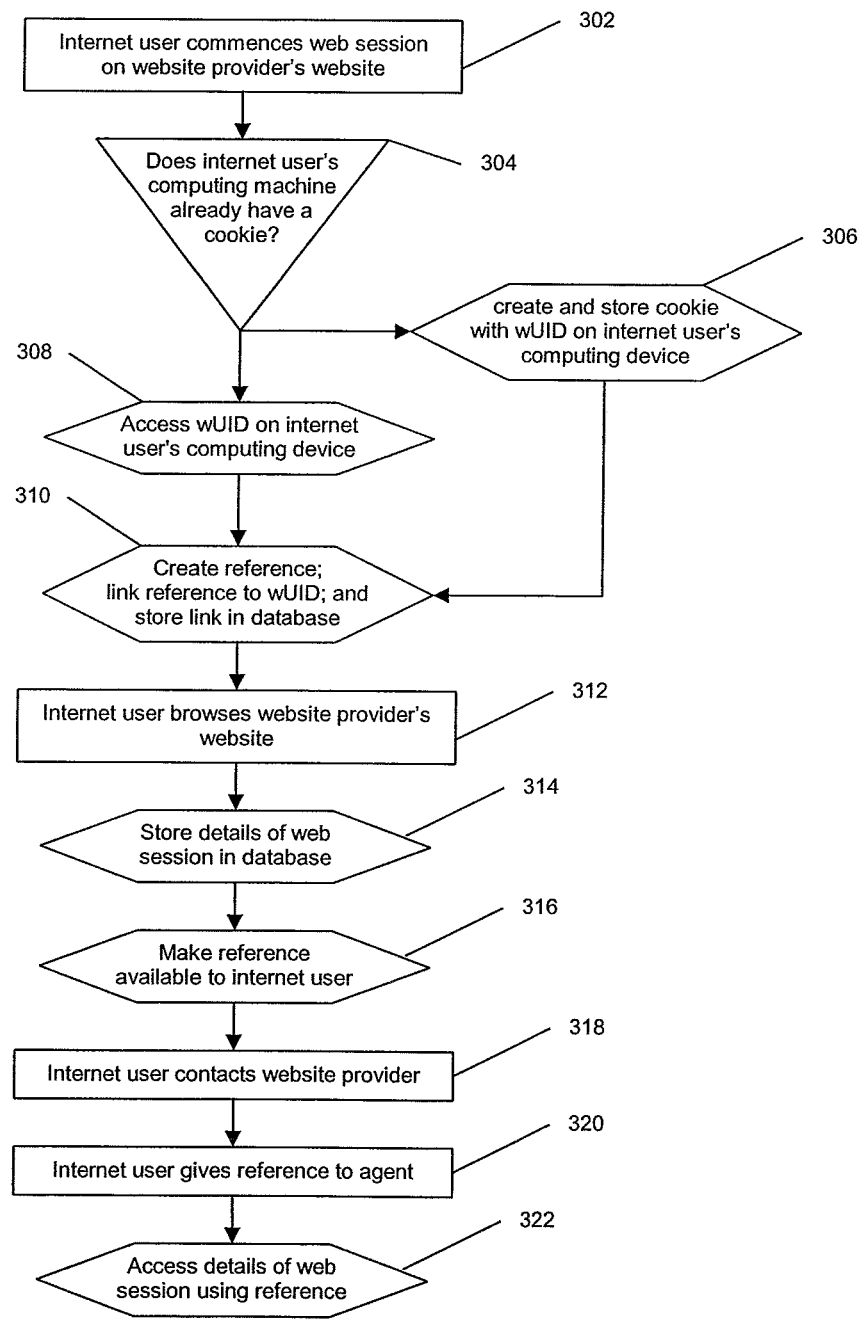
FIG. 3 is a flow chart illustrating a method consistent with the present invention.

A summary of the above described processes is illustrated in FIG. 3. As shown, and as described above, the internet user commences a web session on the website provider's website 302. A check may be made to establish whether the internet user's computing device has a state object (cookie) for the website provider's website stored thereon 304. If not, a state object including the wUID of the internet user's computing device is created and stored on the internet user's computing device 306. Otherwise, the stored state object and associated wUID may be accessed 308. A reference may be created which is linked to the wUID and stored 310, in a database, for example. Thereafter, the internet user may browse the website provider's website 312 and details of the internet user's web session may be stored along with the reference and wUID 314, on the database, for example.

The reference may be made available to the internet user 316, who may make contact with the website provider 318 and give the reference to the website provider's agent 320. Once the agent is in possession of the reference, the web session details of the internet user's web session may be accessed 322.

As explained above, the function of the reference 106 may include providing a link to the wUID 206 of the internet user, which may be passed to the website provider's agent to give the agent access to the details 110, 112 of a shopper's web session and/or web session history associated with the wUID 206.

The reference 106 may take many forms. In its simplest form, the reference 106 may include a reference number which is shown to the internet user whilst the internet user browses the website provider's website 102. Alternatively, if the website provider is a vendor, for example, the reference number might be represented by or form part of one or more product codes associated with products offered by the vendor. For example, in addition to a code which is unique to each product, a product code might be prefixed or suffixed with an additional code which forms the reference for identifying the web session of the shopper. In this scenario, each shopper would see a different product code, formed from the code associated with the product (which remains the same) and the code associated with the reference (which is different for each user). Alternatively, the product code may represent the reference in a more complex way, such as through some form of encoding or encryption, for example, or through the use of a look-up table which creates an association between the product code and the reference.

Additional to providing a plurality of references, a method consistent with the present invention may provide a plurality of contact details such as telephone numbers. In other words, a plurality of references may be allocated to one of plurality of contact details. In this way, each one of ten different telephone numbers, for example, could be used with a batch of ten different product code formats, for example, to provide one hundred different references: telephone A+code 1; telephone A+code 2+ . . . +telephone J+code 9; telephone J+code 10. The same methodology may be used to reduce the length of the reference recited by the internet user, since a portion of the reference may be given by the telephone number or other contact detail, for example.

As explained above, one method of contemporaneous or subsequent interaction with an internet user is by telephone. However, this need not be the case. The internet user might contact the website provider by short messaging service (SMS), fax or email, for example. Depending on the circumstances, the internet user might prefer to interact by post. The website may provide an instant messaging application to interact with an agent directly through the website. The system, method, and devices disclosed herein may be applied in each of these scenarios.

As each reference 106 may serve to identify the particular web session 150 of an internet user, it may be sufficiently unique to ensure that no reference is used to refer to more than one web session. However, in certain circumstances, it may not be possible to provide an endless supply of unique references. Often, it is most practical to provide a quite restricted supply.

For example, a pool of references may be provided. The pooled references may be random numbers, product code suffixes, or any other type of reference. In one example, a product code suffix may be created for use as a reference by selecting the suffix from all available suffixes in the pool. Once selected, the suffix may be linked to a wUID to enable the internet user's web session to be identified simply by referring to the suffix given to the call centre operative along with the product code. Whilst in use as a reference for an internet user's web session, the suffix may be removed from the pool such that it may not be used as a reference for another internet user's web session.

Once the suffix is no longer needed (because, for example, it has been used to identify the internet user's web session) its association with the wUID is relinquished and the suffix is returned to the pool such that it may be used again as a reference for a different internet user. The steps of relinquishing the association and returning the reference may be performed manually by the agent or automatically.

It may be desirable to reduce the quantity of references stored in the pool whilst ensuring that each reference serves as a unique identifier of the web session. The fewer the quantity of references, the shorter each reference need be. This may be done in a number of ways. Firstly, as described above, the allocation of a pool of references (such as, for example, a batch of product codes) to a particular telephone number allows each reference from the pool to be used to identify the web session of a shopper to whom that telephone number has been made available and who has used that telephone number to instigate a communication with the vendor. The provision of another telephone number allows the same pool of references (i.e. the same batch of product codes) to be used whilst still ensuring each reference may be used to identify one web session.

Secondly, the reference may be relinquished, as described above. The reference may be relinquished after a pre-determined period of time. Alternatively, the reference may be relinquished once the web session has been identified by the agent or otherwise.

Alternatively, the reference may be relinquished once the web session has expired. Providing the agent confirms with the internet user during the interaction that the internet user's web session is currently active, the agent can be sure that the reference remains in use and can thus be utilized to identify the internet user's web session. With this last method, the quantity of references in the pool may be greatly reduced since only those web sessions which are active require a reference to be set aside from the pool.

In an embodiment, details of the internet user's identity may be associated with the wUID of the internet user's web session. Such identity details may include the internet user's name, address, telephone number, email address, date of birth, and/or the like.

The internet user's identity may be associated with the wUID during the contemporaneous or subsequent interaction, for example. If the interaction with the internet user takes place by telephone, the agent may make enquiries about the internet user's identity during the telephone conversation and may link the identity details with the wUID once the reference has been received by the agent and the internet user's web session has thus been identified.

Alternatively, the internet user's identity details may already be known to the website provider. For example, the identity details may be stored on a separate database owned by the website provider. In the case where the website provider operates a customer relationship management (CRM) system, the internet user's identity details may be stored on the CRM system. In this case, once the identity details in the CRM system have been found, a link may be created between the details on the CRM system and the internet user's wUID, once the reference has been received by the agent and the internet user's web session has been identified.

In one example, the agent may locate a record of the internet user in a CRM system, or the like. Alternatively, a new record may be created in the system for the internet user. This record may be linked to the wUID (either as a field in the CRM system, the web server database, or both) extracted during the interaction with the internet user and thereby used to permanently associate the internet user's web session information with his record. If the internet user accesses the web site from several computers, his record may become associated with several wUIDs.

In either case, the association of the internet user's identity details with the wUID creates a link between the internet user's identity and the details of the internet user's web sessions. Furthermore, details of subsequent web sessions, which may be linked to the wUID (as explained above), creates a link between the internet user's identity and a web session history.

In the case where the website provider is a vendor and the internet user is a shopper, for example, the above-described arrangement enables the vendor to contact the shopper at a later date using the shopper's identity details. Such contact may be based upon the shopper's web session and/or web session history. For example, if the shopper browses a page of the vendor's website concerning a particular product, these browsing details may be associated with the wUID of the shopper such that the vendor may contact the shopper using the shopper's identity details linked to the wUID with offers about the product.

By using particular types of references it may be possible to direct a subsequent interaction to a particular agent based on the details of the internet user's web session. For example, in the case where the website provider is a vendor, if the details of the shopper's web session indicate that the shopper had been browsing on a page of the vendor's website directed to a particular product, the reference may be flagged for direction to the department responsible for that product. Alternatively, in the case where the website provider is a bank, if the details of the account holder's web session indicate that the account holder is a business account holder, the reference may be flagged for direction to the department responsible for business accounts.

The details of the internet user's web session which form the basis on which a decision is made to direct an interaction to a particular agent or group of agents may be analyzed in a number of ways. For example, each webpage may be associated with a particular agent, and the interaction may be directed to the particular agent associated with the webpage visited by the internet user most often or most recently, for example. Alternatively, the interaction may be directed to a particular agent or group of agents based on how often the website is visited by the internet user or for how long the internet user has been visiting the website, such that frequent or loyal internet users are given a priority service, for example. Other methods of allocation also exist.

In each case, the reference may be identified and the internet user's details may be accessed (through the link to the internet user's wUID, for example) and analyzed (to select an appropriate agent, for example) before the interaction can be directed to an agent.

In cases where the reference is a reference number or product code, for example, further communication with the internet user may be required to obtain the reference. However, if the interaction is by telephone, the communication could take the form of providing the reference using dual-tone multi-frequency (DTMF) signaling or automatic speech recognition to identify the reference using an interactive voice response (IVR) system. Alternatively, the communication could take place with an operative or an agent. If the interaction is by email, the communication could take the form of identifying a reference typed into it in the subject line or body of the email, for example.

In one scenario, the internet user may dial a telephone number which connects him to an IVR system. The internet user may then be prompted to enter a reference code that is displayed on the web page with the telephone number. The system may extract the reference from the received code and associate the wUID linked to the reference with the internet user's telephone call. The system may proceed to examine the internet user's web session information and direct the telephone call based on content therein. For example, if the system identifies that the caller has spent a given period of time browsing the website, and that a high proportion of that period of time was spent browsing in a particular product section, the system may direct the telephone call to an agent who specialises in that product section.

The present invention may be implemented on a legacy telecommunications system to provide the above-described benefits to an already established system. An additional advantage is that, should the system according to the invention fail for some reason, the legacy system may still operate effectively.

In one such legacy system, a 'portal' website may be provided which offers users access to a variety of different products or services from multiple vendors. Each vendor offers a number of products, each having its own product code in a format set by that vendor. Moreover, each vendor provides a telephone number with which a user may contact the vendor to discuss a particular product, by reference to its product code. Of course, the vendor may maintain a plurality of telephone numbers, each directed to a particular department responsible for a group of products, in which case a user wishing to discuss a particular product would telephone the department responsible for that product. The use of a portal is entirely exemplary. Embodiments may be implemented on a single legacy website.

In the legacy system, the vendor may provide a webpage which is adapted to display a given product, its product code and the telephone number which the user should dial to discuss the given product (i.e., the telephone number associated with that product code). Using the legacy system, a user browsing the product may telephone the given number, quote the product code and discuss the product with the vendor. As explained in the background section above, this system may not allow the vendor to identify the user during their telephone conversation.

An embodiment consistent with the present invention operates using a remote server and a computer script written into the portal website or legacy website which executes when a user navigates to the vendor's page. The computer script may extract the product code from the vendor's page and send a request including this detail to the remote server.

The remote server may comprise a relational database which lists all of the product codes of each of the vendors. Upon receipt of the request, the remote server may create a reference which it returns to the portal website for displaying to the user in place of the vendor's product code. In other words, the remote server's reference may overlay and/or replace the vendor's product code on the portal website such that the user is provided with the reference instead of the product code.

Upon receipt of the request, the remote server may create an association in its relational database between the product code, the reference created and the identity of the user. The identity of the user is established using the methods described above.

When the user attempts to contact the vendor using the telephone number provided on the website, the user may be prompted to enter the reference number provided by the remote server. The reference may be spoken directly to an operator, for example, or entered using an IVR system. Once the vendor has been supplied with the reference, it may interrogate the relational database on the remote server and search for the entry corresponding to that reference. Once the entry has been identified in the relational database, the vendor may: 1) determine the product about which the user is calling; and 2) obtain information about the web session of the user.

In optional embodiments, the relational database may store both the product codes and the telephone numbers associated with those product codes. In such embodiments, the computer script may also extract the telephone number from the vendor's website and send this detail along with the product code in the request sent by the portal website to the remote server. This process adds an additional layer of verification to the identification process since a vendor may compare the dialed telephone number and the reference number provided by a user with the details stored in the relational database. If the reference number and telephone number correspond, the vendor may be more certain that the user has not mistyped the reference or dialed an incorrect telephone number. This cross check feature is not limited to legacy systems and may also be applicable to purpose built embodiments described above.

Alternatively, the optional embodiments may be used to reduce the quantity of reference numbers, and accordingly the length of the reference numbers needed to uniquely identify a user. For example, suppose the portal website attracted 100,000 unique customers. In order to readily identify a particular customer absent other qualifying information, the remote server would need to assign a five digit reference number to each user. However, suppose the portal provided access to 100 different vendors, each of which operated 10 departmental phone numbers. In that case, the remote server need only assign a two or three digit reference number since it could be supposed that each telephone number would attract only 100 unique customers. Although many of the 100,000 users would share a given reference number, the identity of each could still be readily identified based on the telephone number dialed.

As mentioned above, an additional advantage of the systems, methods, and devices disclosed herein is that it is failsafe. If the user's browser is incompatible with the invention and incapable of executing the computer scripts necessary for the invention to operate, or if the remote server is offline, for example, the user may be provided with the vendor's original references and telephone numbers with which he may enquire about the product.

The above described embodiments have been exemplified in the context of a vendor and a user enquiring about products from the vendor. These terms are intended to have their broadest meanings; vendors include any service provider such as an agency or institution, and products include any service or trade offered by the vendor.

The above described embodiments may be implemented in one or more computing devices. For example, the above described embodiments may be implemented in a computing device such as a server, a virtual machine, a personal computer, a laptop computer, a distributed computing system, and/or the like. The computing device may include a processor, a memory, and/or a network interface. For example, the above described embodiments may be implemented via computer executable instructions, such as program modules, being executed by the processor of the computing device. Computer executable instructions may include routines, programs, objects, components, data structures and the like that perform particular tasks or implement particular abstract data types. The computer executable instructions may be stored on tangible computer readable storage medium, such as hard drives, flash drives, CD-ROM media, and the like. The network interface may include a telephony modem, Ethernet interface, token-ring interface, Gigabit Ethernet interface, fiber channel interface, wireless network interface, and/or the like. The memory may include read only memory, random access memory, hard disk drive, a magnetic disk drive, an optical disk drive, flash drive memory, or the like. The drives and their associated computer readable storage media may provide non-volatile storage of computer readable instructions, data structures, program modules and other data.

In one embodiment, a method and/or device is provided of supplementing a pre-existing reference number on a legacy website provided by a legacy website provider with an enhanced reference number capable of identifying an internet user engaged in a web session on said legacy website to facilitate interaction between said internet user and said website provider.

The method may comprise the step of: making a check to establish whether the internet user's computing device has a state object for the website provider stored thereon, the state object comprising a web user ID (wUID) which is unique to the web user's computing device to identify the internet user.

The method may also comprise the step of receiving a request to provide an enhanced reference number for identifying the internet user's web session. The request may contain the pre-existing reference number.

The method may also comprise the steps of creating an enhanced reference number based on the pre-existing reference number upon receipt of said request; storing an association between the wUID and the enhanced reference number in a database accessible by the website provider; and making the enhanced reference number available to the user by displaying it in place of the pre-existing reference number on the legacy website via the web session.

In an embodiment, the method may further comprises the step of receiving the reference from the user during the interaction with the user, thereby enabling the web session to be identified and the information to be accessed therefrom.

In an embodiment, the method may further comprise the steps of creating or selecting an identifier for identifying the internet user; and creating an association between the identifier and the wUID in the database so as to associate the internet user identifier with the internet user's web session once the web session has been identified. The subsequent interaction may be by telephone and the identifier may comprise the user's calling line identity (CLI). The subsequent interaction may be by email and the identifier may comprise the user's email address.

In an embodiment, the reference number may be represented by or comprises at least part of a product code for identifying a product viewed during the internet user's web session.

In an embodiment, the method may further comprise the step of directing the interaction with the user to a particular recipient based on the reference received from the user.

In an embodiment, the step of directing the interaction may comprise the steps of: scrutinizing the information from the internet user's web session; and selecting the particular recipient on the basis of the information.

In one embodiment, the method may further comprise the steps of constructing a bespoke web page based on the information accessed from the internet user's web session and providing the internet user with access to the bespoke web page.

In an embodiment, information from the internet user's web session may be stored in the database with the wUID such that it may be accessed via the reference.

In an embodiment, information from the subsequent web sessions of the internet user may be stored in the database with the wUID to create a web session history.

In an embodiment, the pre-existing reference number may be one of a plurality of reference numbers. Each of said pre-existing reference numbers may be associated with one of a plurality of contact details for contacting the website provider and the associations between each pre-existing reference number and said one of a plurality of contact details may be stored in the above-mentioned database. In such cases, the received request may further comprise said one of a plurality of contact details. The contact detail may be one of a telephone number; an email address; and a postal address.

The method may include parsing the legacy website using an extraction engine and extracting from the legacy website the pre-existing reference number and/or the contact detail.

In another embodiment, a method is provided of providing a reference to an internet user, via the internet user's computing device, during the internet user's web session on a website of a website provider to facilitate interaction between said internet user and said website provider.

The method may comprise the step of making a check to establish whether the internet user's computing device has a state object for the website provider stored thereon, the state object comprising a web user ID (wUID) which is unique to the web user's computing device to identify the internet user.

The method may comprise the step of creating a reference for identifying the internet user's web session, the reference being capable of identifying a product viewed during the internet user's web session, the product associated with one of a plurality of contact details.

Finally, the method may comprise the steps of storing an association between the state object ID and the reference in a database accessible by the website provider; making the reference available to the user via the web session; and receiving the reference from the user during the interaction with the user. The interaction may be instigated by the user using said one of a plurality of contact details, thereby enabling the web session to be identified and information to be accessed therefrom.

The contact detail may be a telephone number, in which case the contact is a telephone call made by the user to the telephone number. Alternatively, the contact detail may be an email address, in which case the contact is an email sent by the user to the email address. Alternatively, the contact detail may be a postal address, in which case the contact is correspondence sent by the user to the postal address.

The method according may further comprise the steps of creating or selecting an identifier for identifying the internet user; and associating the identifier with the internet user's web session once the web session has been identified. If the interaction is by telephone, the identifier may comprise the user's calling line identity (CLI). If the interaction is by email, the identifier may comprise the user's email address.

In embodiments, the method may further comprise the step of directing the interaction with the user to a particular recipient based on the reference received from the user. This step may optionally comprise the steps of: scrutinizing the information from the internet user's web session; and selecting the particular recipient on the basis of the information.

In embodiments, the method may further comprise the steps of: constructing a bespoke web page based on the information accessed from the internet user's web session; and providing the internet user with access to the bespoke web page.

Information from the internet user's web session may be stored in the database with the wUID such that it may be accessed via the reference. In this case, information from subsequent web sessions of the internet user may also be stored in the database with the wUID to create a web session history.

In another embodiment, a method may be provided comprising the step of providing a reference for identifying an internet user during an interaction with the internet user, the whole or a portion of the reference comprising or represented by at least part of a product code.

It will be appreciated that systems, methods, and devices disclosed herein have been described by way of example only, and that alternative features and methods will readily occur to the skilled person which will not depart from the scope of the present invention, as described in the appended claims.

What is claimed:

1. A method of supplementing a pre-existing reference number on a legacy website provided by a legacy website provider with an enhanced reference number capable of identifying an internet user engaged in a web session on said legacy website to facilitate interaction between said internet user and said website provider, comprising the steps of:
    making a check to establish whether the internet user's computing device has a state object for the website provider stored thereon, the state object comprising a web user ID (wUID) which is unique to the internet user's computing device to identify the internet user;
    receiving a request to provide an enhanced reference number for identifying the internet user's web session, said request containing the pre-existing reference number;
    creating, via a processor, the enhanced reference number based on the pre-existing reference number upon receipt of said request, the enhanced reference number independent from the wUID;
    storing an association between the wUID and the enhanced reference number in a database accessible by the website provider; and
    making the enhanced reference number available to the user by displaying it in place of the pre-existing reference number on the legacy website via the web session such that the user can provide the enhanced reference number to an agent of the website provider.

2. The method of claim 1, further comprising the step of identifying the web session and accessing information therefrom using the reference received from the user during an interaction with the user.

3. The method of claim 2, further comprising the steps of:
    creating or selecting an identifier for identifying the internet user; and
    creating an association between the identifier and the wUID in the database so as to associate the internet user identifier with the internet user's web session once the web session has been identified.

4. The method of claim 3, wherein the interaction is by telephone and the identifier comprises the user's calling line identity (CLI).

5. The method of claim 3, wherein the interaction is by email and the identifier comprises the user's email address.

6. The method of claim 1, wherein the enhanced reference number is represented by or comprises at least part of a product code for identifying a product viewed during the internet user's web session.

7. The method of claim 1, wherein information from the internet user's web session is stored in the database with the wUID such that it may be accessed via the enhanced reference number.

8. The method of claim 7, wherein information from subsequent web sessions of the internet user is stored in the database with the wUID to create a web session history.

9. The method of claim 1 wherein:
    the pre-existing reference number is one of a plurality of reference numbers;
    each of said pre-existing reference numbers is associated with one of a plurality of contact details for contacting the website provider; and
    the associations between each pre-existing reference number and said one of a plurality of contact details are stored in said database; and wherein:
    said request further comprises said one of a plurality of contact details.

10. The method of claim 1, further comprising the step of parsing the legacy website using an extraction engine and extracting from the legacy website the pre-existing reference number.

11. The method of claim 9, wherein the contact detail is one of a telephone number; an email address; and a postal address.

12. A method of identifying an internet user engaged in a web session on a legacy website provided by a legacy website provider to facilitate interaction between said internet user and said website provider, said website provider providing a pre-existing reference number which is supplemented with an enhanced reference number capable of identifying the internet user engaged in the web session, comprising the steps of:
    receiving the enhanced reference number from the internet user during an interaction instigated by the internet user, wherein the internet user viewed the enhanced reference number during the web session, the enhanced reference number created independently from information that identifies the internet user; and
    accessing, via a processor, a database on which there is stored a relationship between the enhanced reference number and a web user ID (wUID) of the internet user, said wUID being unique to the internet user's computing device to identify the internet user.

13. The method of claim 12, further comprising the step of identifying the web session and accessing information therefrom using the reference received from the user during the interaction with the user.

14. The method of claim 13, further comprising the step of directing the interaction instigated by the user to a particular recipient based on the enhanced reference received from the user.

15. The method of claim 14, wherein the step of directing the interaction comprises the steps of;
    scrutinizing the information from the internet user's web session; and
    selecting the particular recipient on the basis of the information.

16. The method of claim 13, further comprising the steps of
constructing a bespoke web page based on the information accessed from the internet user's web session; and
providing the internet user with access to the bespoke web page.

17. A method of providing a reference to an internet user, via the internet user's computing device, during the internet user's web session on a website of a website provider to facilitate interaction between said internet user and said website provider, comprising the steps of:
making a check to establish whether the internet user's computing device has a state object for the website provider stored thereon, the state object comprising a web user ID (wUID) which is unique to the internet user's computing device to identify the internet user;
creating, via a processor, a reference for identifying the internet user's web session, the reference being capable of identifying a product viewed during the internet user's web session, said reference allocated to one of a plurality of contact details and said reference independent from the wUID;
storing an association between the wUID and the reference in a database accessible by the website provider;
making the reference available to the user via the web session such that the user can provide the reference to an agent of the website provider; and
identifying the web session and accessing information therefrom using the reference received from the user during an interaction with the user, the interaction having been instigated by the user using said one of a plurality of contact details.

18. The method claim 17, wherein:
the contact detail is a telephone number; and
the contact is a telephone call made by the user to the telephone number.

19. The method of claim 17, wherein:
the contact detail is an email address; and
the contact is an email sent by the user to the email address.

20. The method of claim 17, wherein:
the contact detail is a postal address; and
the contact is correspondence sent by the user to the postal address.

21. The method of claim 17, further comprising the steps of:
creating or selecting an identifier for identifying the internet user; and
associating the identifier with the internet user's web session once the web session has been identified.

22. The method of claim 21, wherein the interaction is by telephone and the identifier comprises the user's calling line identity (CLI).

23. The method of claim 22, wherein the interaction is by email and the identifier comprises the user's email address.

24. The method of claim 17, wherein information from the internet user's web session is stored in the database with the wUID such that it may be accessed via the reference.

25. The method of claim 14, wherein information from subsequent web sessions of the internet user is stored in the database with the wUID to create a web session history.

26. A method of identifying an internet user engaged in a web session on a website of a website provider to facilitate interaction between said internet user and said website provider, said website provider providing a reference to the internet user during the internet user's web session, the reference being capable of identifying the internet user's web session and a product viewed during the internet user's web session, said reference allocated to one of a plurality of contact details, comprising the steps of:
receiving the reference from the internet user during an interaction instigated by the internet user using said one of a plurality of contact details, wherein the internet user viewed the reference during the web session, the reference created independently from information that identifies the internet user; and
accessing, via a processor, a database on which there is stored a relationship between the reference and the contact detail and a relationship between the reference and a web user ID (wUID) of the internet user, said wUID being unique to the web user's computing device to identify the internet user; and
identifying the web session and accessing information therefrom using the reference received from the user during the interaction with the user.

27. The method of claim 26, further comprising the step of directing the interaction instigated by the user to a particular recipient based on the reference received from the user.

28. The method of claim 27, wherein the step of directing the interaction comprises the steps of:
scrutinizing the information from the internet user's web session; and
selecting the particular recipient on the basis of the information.

29. The method of claim 26, further comprising the steps of:
constructing a bespoke web page based on the information accessed from the internet user's web session; and
providing the internet user with access to the bespoke web page.

30. The method of claim 26 at least a portion of the reference comprising or represented by at least part of a product code that identifies the product.

* * * * *